W. W. HAUGHEY.
PROCESS OF PRODUCING FERTILIZER MATERIAL.
APPLICATION FILED NOV. 11, 1916.
1,232,032.
Patented July 3, 1917.
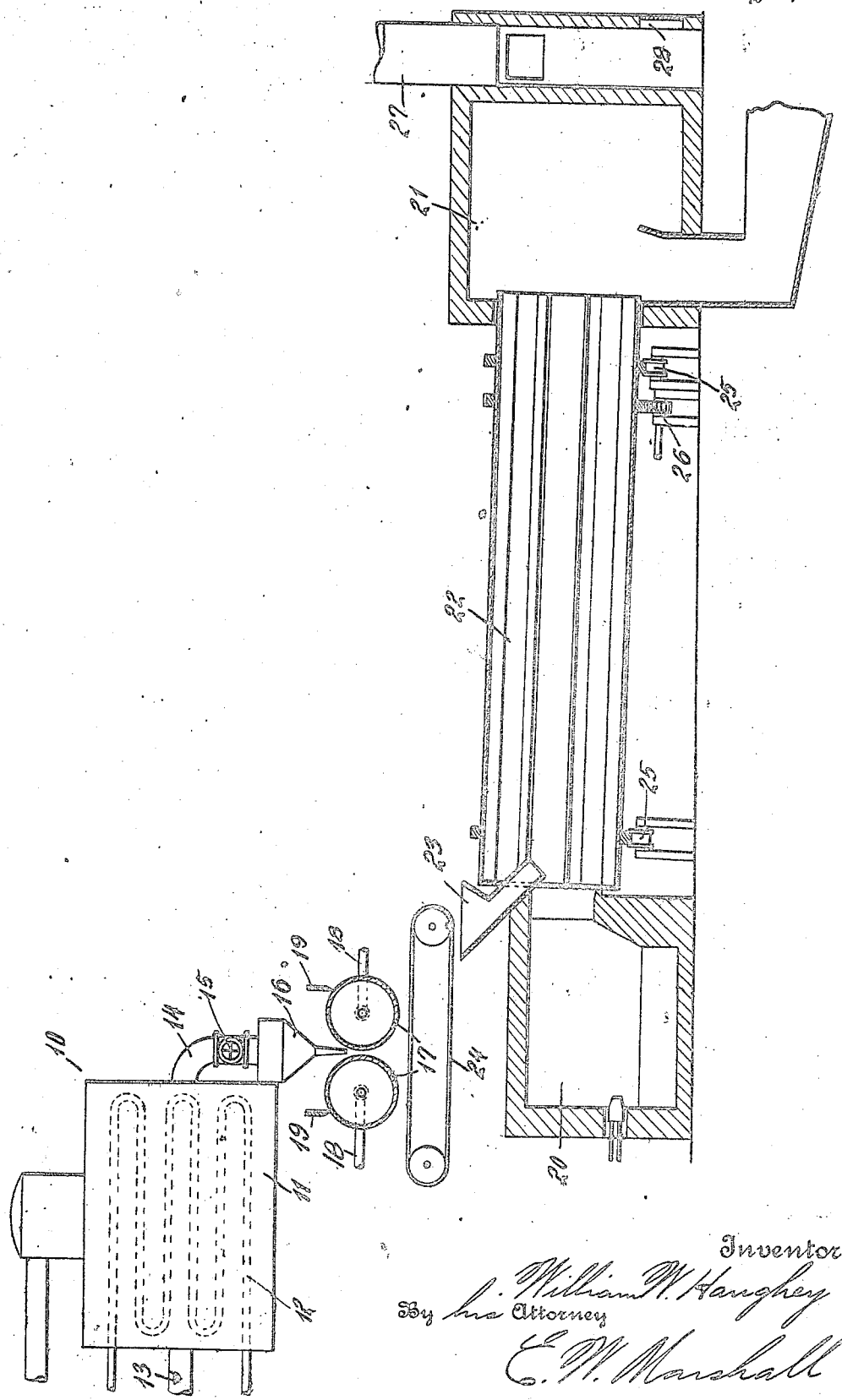

UNITED STATES PATENT OFFICE.

WILLIAM W. HAUGHEY, OF GARDEN CITY, NEW YORK, ASSIGNOR TO BY-PRODUCTS RECLAIMING CORPORATION, OF NEW YORK, N. Y., A CORPORATION OF NEW YORK.

PROCESS OF PRODUCING FERTILIZER MATERIAL.

1,232,032.   Specification of Letters Patent.   Patented July 3, 1917.

Application filed November 11, 1916. Serial No. 130,716.

*To all whom it may concern:*

Be it known that I, WILLIAM W. HAUGHEY, a citizen of the United States, and a resident of Garden City, county of Nassau and State of New York, have invented certain new and useful Improvements in Processes of Producing Fertilizer Material, of which the following is a specification, reference being had to the accompanying drawing, forming a part thereof.

My invention relates to fertilizers or compounds which are adapted to be mechanically mixed with other ingredients in the production of commercial fertilizer. It has special reference to the reclamation of cane or beet molasses after fermentation and distillation in the manufacture of alcohol and alcoholic liquors, or more specifically to the conversion of distillery slops into fertilizer material without loss of valuable ingredients.

Distillery slops generally contain about 94% water, although this liquid as delivered from some distilleries, may contain as low as 60%. The solid matter is held in solution and comprises from 8 to 12% potassium compounds, such as carbonate of potassium, chlorid of potassium, and sulfate of potassium and a considerable quantity of albuminoids and proteins which are rich in nitrogen.

If the material is heated to high temperatures, it is found that the resulting solid contains no appreciable quantity of nitrogen and while it contains potassium compounds and is of some value for fertilizer, the nitrogen which is also valuable, is lost.

One object of my invention is to provide a process of treating distillery slops by which a fertilizer material or fertilizer base may be produced which shall retain substantially the full percentage of nitrogen and which at the same time shall be substantially non-hydroscopic.

In order that my invention may be thoroughly understood, I will now proceed to describe the same in the following specification, and then point out the novel features thereof in appended claims.

Referring to the drawings, the single figure is a diagrammatic view showing suitable apparatus for practising the process of my invention.

In carrying out the process of my invention any suitable apparatus may be employed, the drawings being illustrative of one such apparatus.

10 designates an evaporator of any well known type comprising, for example, a tank or chest 11 within which is a steam coil 12, the distillery slops or like material to be treated being supplied through a pipe 13 and discharged in the form of a concentrated liquid, through pipe 14 in which is a control valve 15. The outlet pipe discharges into a funnel 16 which in turn delivers the concentrated liquid which contains approximately 40% water and has the consistency of thin syrup, to a pair of stick rolls 17. These rolls are driven in a well known manner and are heated at a temperature of about 300° F. by steam or some other suitable means so that the liquid is dried out rapidly, forming a solid coating which adheres to the drum and which is removed by scrapers 19.

As the dry solid matter falls from the rolls, it is delivered to a drying furnace where it is heated at a predetermined critical temperature sufficient to render it non-hydroscopic by driving off certain ingredients including a small percentage of glycerin, without dissipating the nitrogen.

20 designates the fire box of a furnace having a smoke or air box 21 and an interposed rotary drum 22. The drum is provided internally with longitudinal ribs which may have a spiral curvature to assist in carrying the material forward. The drum is inclined downwardly to a slight extent from the fire box and has a hopper 23 into which the aforesaid dry solid matter is delivered. It may be conveniently carried from the stick rolls to the hopper by a belt conveyer 24 or some other suitable means.

The drum 22 is rotatively mounted on rollers 25 and is driven by a shaft 26 so that it is slowly but continuously revolving. The hot gases from the furnace pass through the drum and impart heat to the solid material as it gradually advances through the drum. The gases escape into the air box 21 and outward through the flue 27. The temperature of the gases is regulated by adjusting the air opening 28 in the box 21 or by regulating the fire or the burners if an oil or gas furnace is utilized, so that the gases do not exceed a predetermined critical temperature.

The solid matter as it is delivered from the stick rolls is a relatively dry, brittle material but it is very hydroscopic and soon has the consistency of a very thick liquid or soft gum if exposed to the atmosphere. However, after it is passed slowly through the rotary baking drum 22 it becomes substantially non-hydroscopic and is capable of being finely divided so that it is well adapted for use as a commercial fertilizer material. The critical temperature for this material is approximately 700° F. and if the temperature of the furnace is insufficient the material will adhere to the interior of the drum. On the other hand, if the temperature of the furnace is too great, the nitrogen will be entirely driven off and the value of the resultant dry material will be much less.

Variations may be effected within the spirit and scope of my invention, and I intend that only such limitations be imposed as are indicated in the appended claims.

What I claim is:

1. The process of treating distillery slops for the production of fertilizer material that consists in partially evaporating the water to produce a relatively concentrated solution, drying out the remainder of the water, and finally roasting the dry product at a critical temperature sufficient to render the material non-hydroscopic without driving off the nitrogen as herein described.

2. The process of treating distillery slops for the production of fertilizer material that consists in partially evaporating the water to produce a relatively concentrated solution, drying out the remainder of the water at a temperature of about 300° F., and finally roasting the dry product at approximately 700° F., to render the material non-hydroscopic.

3. The process of treating distillery slops or the like that consists in evaporating the water therefrom and in applying heat thereto within a predetermined critical maximum temperature to produce a non-hydroscopic material without driving off the nitrogen.

In witness whereof, I have hereunto set my hand this 10 day of November, 1916.

WILLIAM W. HAUGHEY.